(12) United States Patent
Patelczyk et al.

(10) Patent No.: US 6,409,259 B1
(45) Date of Patent: Jun. 25, 2002

(54) AUTOMOTIVE VEHICLE SUNROOF

(75) Inventors: Jeffrey S. Patelczyk, Woodhaven, MI (US); Gregory M. Beauprez, Toledo, OH (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/545,943

(22) Filed: Apr. 10, 2000

(51) Int. Cl.[7] ................................................ B60J 7/12
(52) U.S. Cl. ................... 296/219; 296/220.01; 296/223
(58) Field of Search ............................ 296/219, 220.01, 296/223

(56) References Cited

U.S. PATENT DOCUMENTS

| 508,815 | A | | 11/1893 | Cox |
|---|---|---|---|---|
| 1,245,278 | A | | 11/1917 | Sherman |
| 1,413,424 | A | | 4/1922 | Pcezenik |
| 1,738,060 | A | | 12/1929 | Barnes |
| 1,883,739 | A | | 10/1932 | Ford |
| 2,109,710 | A | * | 3/1938 | Saives ................... 296/224 X |
| 4,059,141 | A | | 11/1977 | Hutton |
| 4,157,845 | A | | 6/1979 | Queveau |
| 4,422,686 | A | | 12/1983 | Droz |
| 4,830,428 | A | * | 5/1989 | Masuda et al. ............. 296/219 |
| 4,893,868 | A | | 1/1990 | Miller et al. |
| 5,050,661 | A | | 9/1991 | Sikkema et al. |
| 5,101,684 | A | * | 4/1992 | Mosslacher ............. 296/223 X |
| 5,169,206 | A | | 12/1992 | Omoto et al. |
| 5,299,791 | A | | 4/1994 | Schlapp |
| 5,310,241 | A | | 5/1994 | Omoto et al. |
| 5,471,789 | A | | 12/1995 | Faircloth |
| 5,584,329 | A | | 12/1996 | Thomas |
| 5,598,883 | A | | 2/1997 | Platsis |
| 5,897,160 | A | | 4/1999 | Reihl et al. |
| 5,944,378 | A | | 8/1999 | Mather et al. |
| 6,270,154 | B1 | | 8/2001 | Farber |

FOREIGN PATENT DOCUMENTS

| CH | 165013 | * 10/1933 | ................. 296/219 |
|---|---|---|---|
| WO | WO 90/00986 | 2/1990 | |
| WO | WO 96/01191 | 1/1996 | |

OTHER PUBLICATIONS

English tranlation of Swiss Patent No. 165,013 published on Jan. 16, 1934, inventor—Fehler.

* cited by examiner

*Primary Examiner*—Dennis H. Pedder
(74) *Attorney, Agent, or Firm*—Harness, Dickey & Pierce, P.L.C.

(57) ABSTRACT

An automotive vehicle sunroof includes a linkage assembly, one or more elongated elements and a flexible cover. In another aspect of the present invention, the flexible cover is folded in an overlapping manner when retracted. A further aspect of the present invention provides at least a pair of flexible covers that are advanced toward each other in order to close a single sunroof opening.

54 Claims, 10 Drawing Sheets

AUTOMOTIVE VEHICLE SUNROOF

BACKGROUND AND SUMMARY OF THE INVENTION

The present invention generally pertains to automotive vehicle roof systems and more particularly to a sunroof for use in an automotive vehicle.

It is known to employ flexible roof covers for automotive vehicles. For example, a flexible roof cover can be retracted by winding it around a spring loaded roller. Such designs are disclosed in U.S. Pat. No. 1,245,278 entitled "Auto Top" which issued to Sherman on Nov. 6, 1917, and U.S. Pat. No. 1,738,060 entitled "Roof of Motor Cars and the Like Vehicles of the Inclosed or Saloon Type" which issued to Barnes on Dec. 3, 1929. More recent variations of single and flexible sunroof covers are disclosed in U.S. Pat. No. 4,893,868 entitled "Vehicle Door-to-Door Sunroof Assembly" which issued to Miller et al. on Jan. 16, 1990, and WO 96/01191 entitled "Sunshade for an Automotive Vehicle Roof" which was published on Jan. 18, 1996.

In accordance with the present invention, a preferred embodiment of an automotive vehicle sunroof includes a linkage assembly, one or more elongated elements and a flexible cover. In another aspect of the present invention, the flexible cover is folded in an overlapping manner when retracted. A further aspect of the present invention provides at least a pair of flexible covers that are advanced toward each other in order to close a single sunroof opening. In yet another aspect of the present invention, a linkage assembly attached to a flexible cover is manually actuable. A method of operating an automotive vehicle sunroof is also provided.

The automotive vehicle sunroof of the present invention is advantageous over conventional sunroof constructions in that the present invention is significantly less costly and lighter weight. This is especially true when the manually actuated, flexible cover embodiment is compared to traditional electric motor driven glass sunroofs. Furthermore, the overlapping folded arrangement of the present invention sunroof does not require the bulkiness and weight of a conventional roller mechanism and the stowed support strips or frame. Additionally, the present invention allows for independent opening of the sunroof cover above a driver or passenger by employing multiple covers. A low cost and reliable driving and slave linkage system is employed with the present invention which can be smoothly moved and compactly packaged. Additional advantages and features of the present invention will become apparent from the following description and appended claims, taken in conjunction with the accompanying drawings.

DETAILED DESCRIPTION OF THE PREFERRED EMBODIMENT

Figure 1:
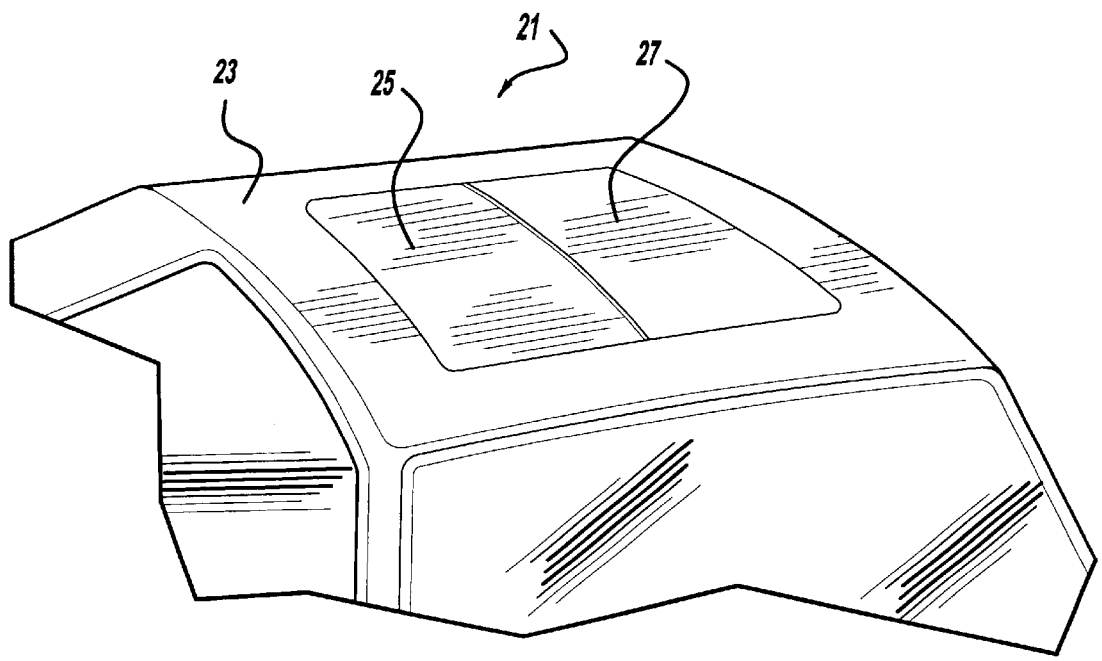
FIG. 1 is a perspective view showing the preferred embodiment of an automotive vehicle sunroof of the present invention, with covers disposed in closed positions.

Referring to FIGS. 1–6, a sunroof assembly 21 is located in a stationary roof 23 of an automotive vehicle and includes a pair of flexible sunroof covers 25 and 27 which are independently movable from closed positions (see FIG. 1) to open positions (see FIG. 2), thereby exposing a single and uninterrupted sunroof opening 29. Stationary roof 23 of the vehicle has a depressed step 41. Sunroof assembly 21 is installed as a preassembled modular unit to the roof by adhering or riveting a generally rectangularly shaped frame 43 to step 41. An internal flange or edge 45 of frame 43 defines a vertical plane corresponding to sunroof opening 29. Frame 43 is stamped from metal and has a somewhat U-cross sectional shape which serves as a water receiving drain trough around all four sides of the sunroof opening area. Drainage holes and tubes (not shown) are disposed in each corner of frame 43. Sunroof assembly 21 has a truncated wedge-like top view, peripheral shape.

Figure 4:
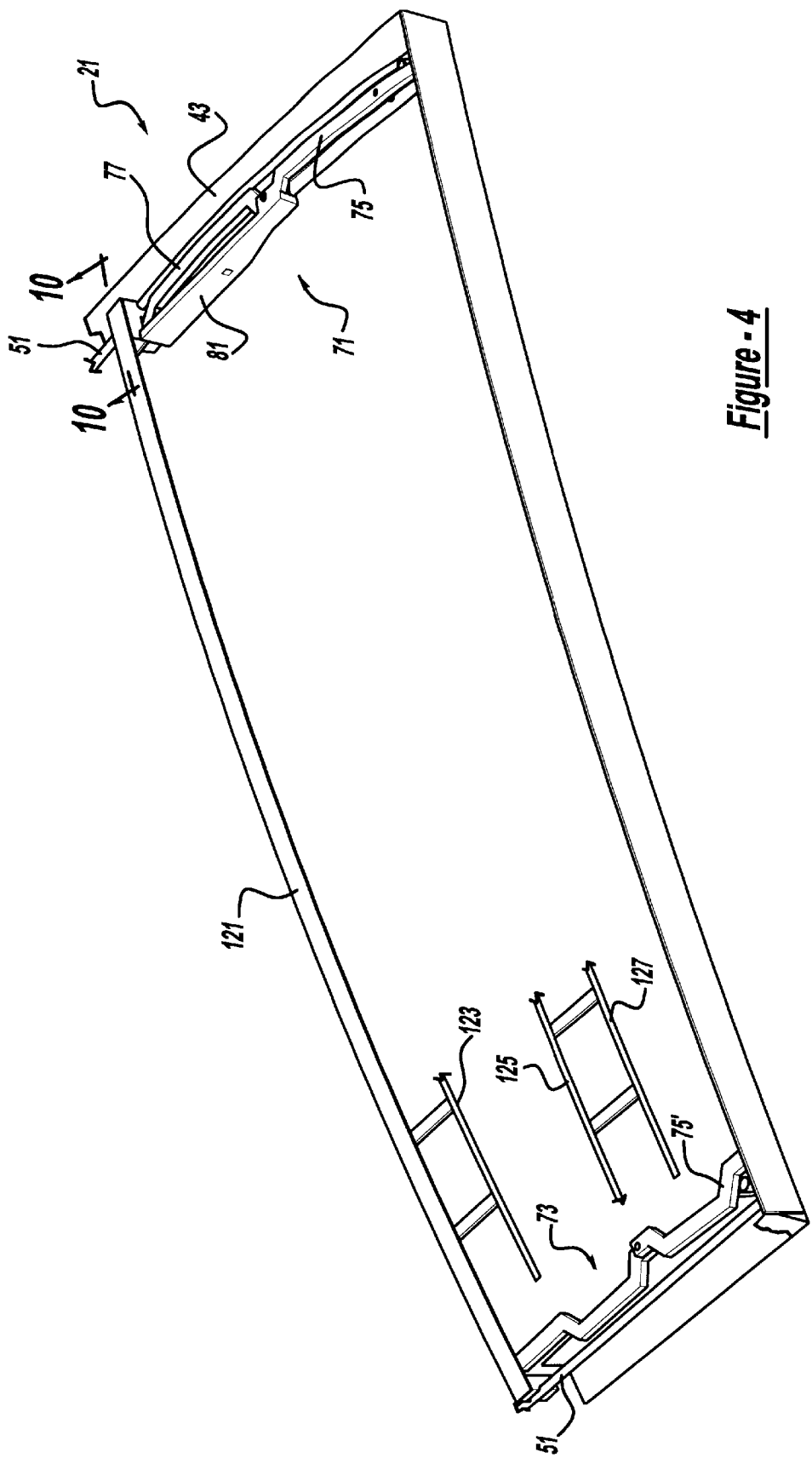
FIG. 4 is a fragmentary perspective view showing the preferred embodiment sunroof disposed in a closed position, with the cover removed.
Figure 5:
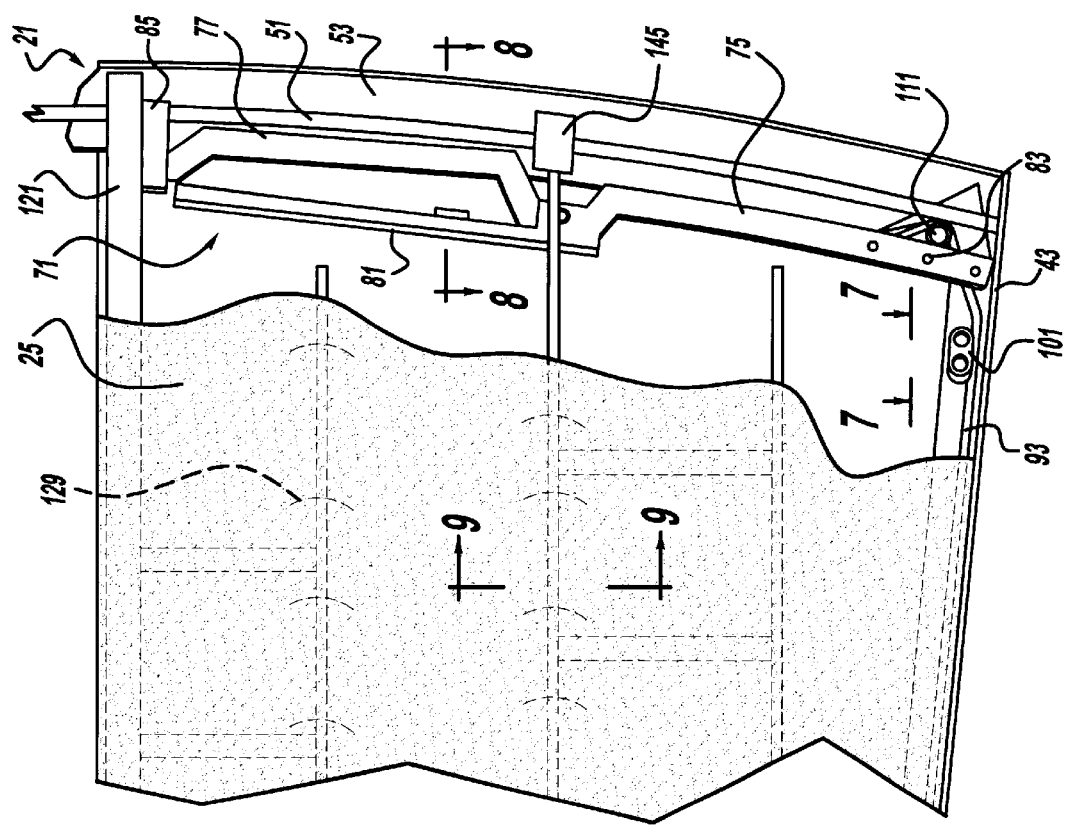
FIG. 5 is a fragmentary top elevational view showing the preferred embodiment sunroof disposed in a closed position.
Figure 5:
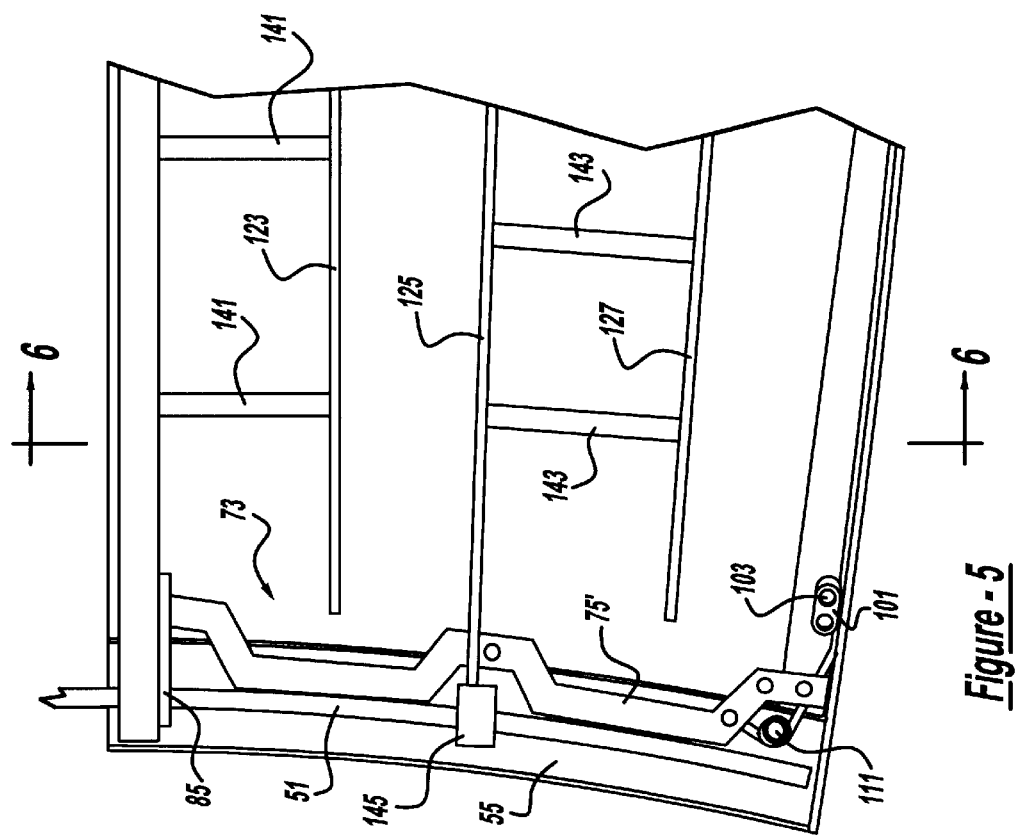
Figure 6:
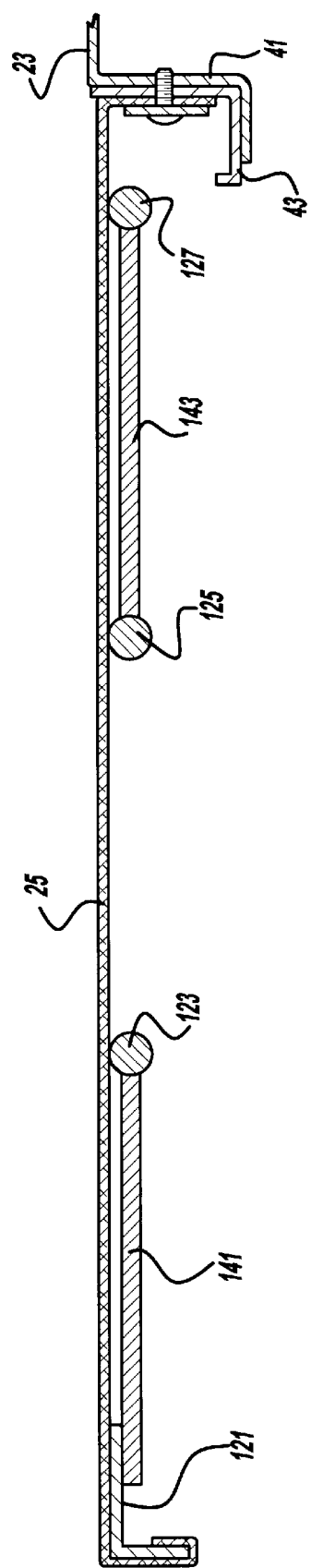
FIG. 6 is a cross sectional view, taken along line 6—6 of FIG. 5, showing the preferred embodiment sunroof disposed in a closed position.
Figure 10:
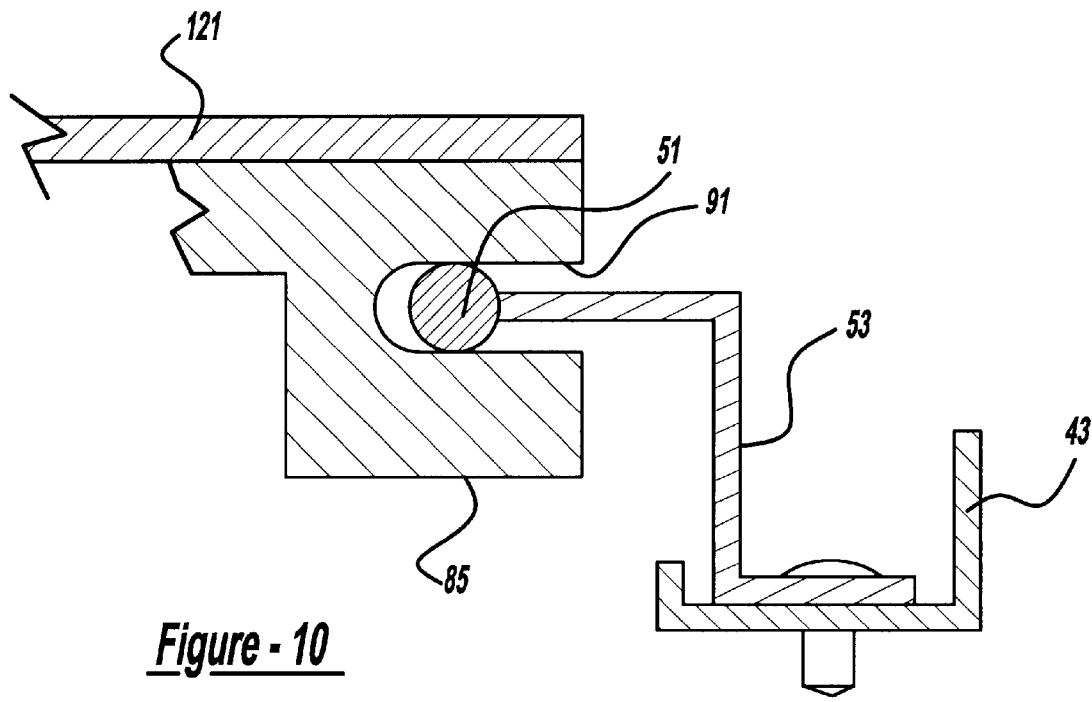
FIG. 10 is a cross sectional view, taken along line 10—10 of FIG. 4, showing the preferred embodiment sunroof.
Figure 9:
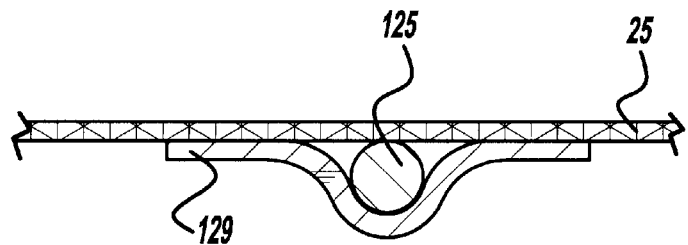
FIG. 9 is a cross sectional view, taken along line 9—9 of FIG. 5, showing the preferred embodiment sunroof.
Figure 11:
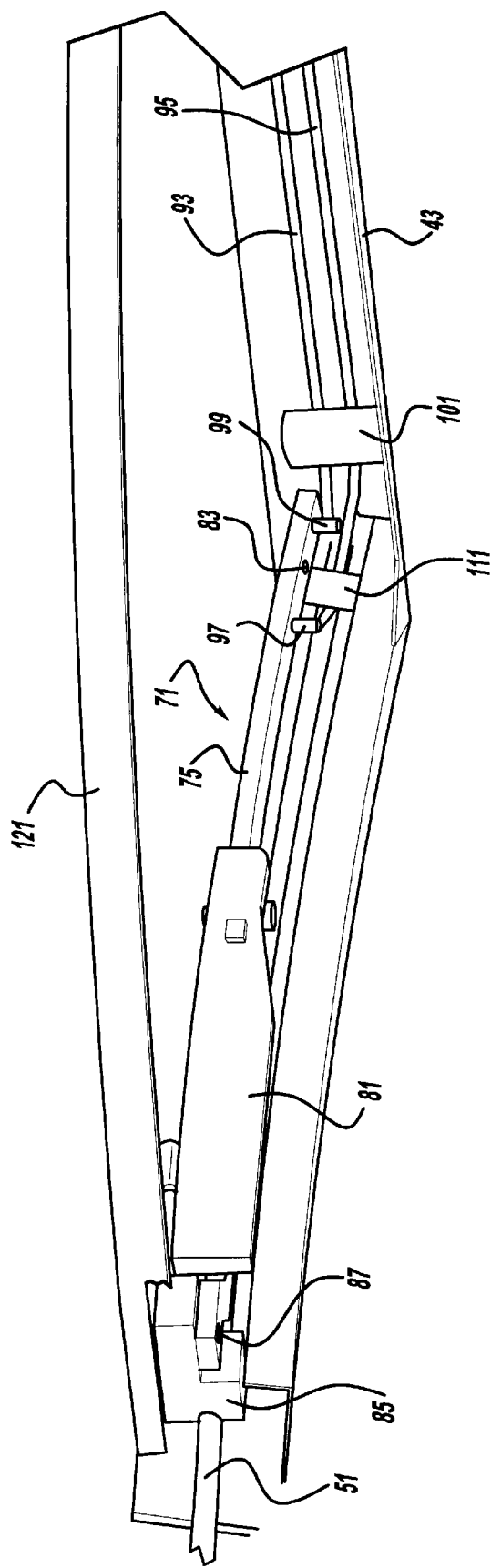
FIG. 11 is a fragmentary perspective view, observed from below the sunroof, showing the preferred embodiment sunroof disposed in a closed position, with the cover removed.

Referring now to FIGS. 4, 5 and 10, a rod-like track 51 is positioned within the front 53 and rear 55 segments of frame 43. Each track 51 is mounted to a bottom of frame 43 by elongated brackets 53. Track 51 is welded onto an in-board leg of bracket 53 while an outboard leg of bracket 53 is riveted, screwed or otherwise fastened to frame 43. Track 51 and bracket 53 are preferably made from metal such as steel or aluminum.

A driving linkage assembly 71 and a slave linkage assembly 73 are associated with each of covers 25 and 27. The construction of the linkage assemblies are best illustrated in FIGS. 4, 5, 11, 12 and 13. Driving linkage assembly 71 includes a primary link 75 and a secondary link 77. Links 75 and 77 are pivotably coupled together at a pivot 79. A manually actuable handle 81 projects from an end of primary link 75. The opposite end of primary link 75 is pivotably coupled to a stationary member, such as frame 43 or alternately a portion of roof 23, at pivot 83. An end of secondary link 77, opposite pivot 79, is pivotably connected to a slide block 85 by a pivot 87. FIG. 10 shows an open ended slot 91 of slide block 85 engaging around track 49. Extra inboard-outboard clearance is provided to account for tolerance variations as well as cold weather contraction of cover 25. Links 75 and 77 are preferably made from cast or stamped metal while slide block 85 is preferably made from a lubricious polymer such as Delrin® acetyl resin.

Figure 7:
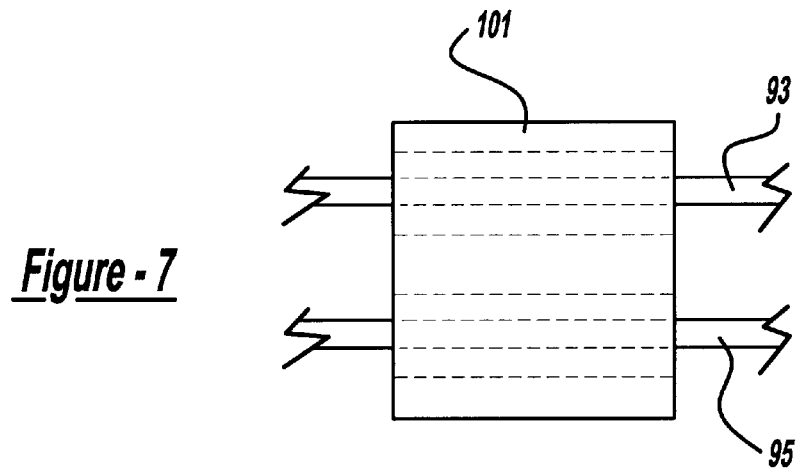
FIG. 7 is a fragmentary side elevational view showing a cable guide block and cables employed in the preferred embodiment sunroof.

Slave linkage assembly 73 is constructed almost identically to that of drive linkage assembly 71 except that a handle is not provided on slave linkage assembly 73. Instead, a pair of coated, braided steel cables 93 and 95 connect posts 97 and 99, respectively, projecting from primary links 75 and 75'. These cables are positioned outboard of the sunroof opening and above frame 43 by a pair of cable guide blocks 101 (see FIGS. 5, 7 and 11). Each cable guide block 101 is secured to the cross-car side segments of frame 43 by a pair of screws 103. Circular-cylindrical pedestals 111 upwardly project from each corner of frame 43 and serve as pulleys to change the pulling direction of cable 95. Pedestal 111 and cable guide block 101 are molded from Delrin® acetyl resin.

An elongated metal support-like element 121 spans in a fore and aft direction across sunroof opening 29 and is slidably coupled to tracks 51 by slide blocks 85, as is illustrated in FIGS. 5, 6, 9 and 12. Element 121 has a generally L-cross sectional shape with a downwardly projecting flange. The distal end of cover 25 is wrapped around the flange of element 121 and secured in place by adhesive or the like. Cover 25 is preferably a twill or Lucerne fabric such as the type often used for convertible roofs.

Three additional elongated supports, called battens 123, 125 and 127 are fastened to an underside of cover 25 by way of listing strips 129. Strips 129 are secured to cover 25 through adhesive bonding, staples or sewing. Battens preferably have a circular cross sectional shape and are made from metal. While battens 123, 125 and 127, as well as element 121, are significantly more rigid than cover 25, they can alternately be made of slightly flexible fiberglass or polymeric strips of varying cross sectional shape. A first set of metal fingers 141 are welded between batten 123 and element 121. Similarly, a second set of metal fingers 143 are welded between battens 125 and 127. Each finger is spaced from the adjacent one in each set. A slide block 145, like slide block 85, is mounted to each end of batten 125, clear of an offset in the adjacent linkage assembly, to more accurately control sliding movement at the middle of cover 25. The proximal end of cover 25 is secured to frame 43.

Figure 8:
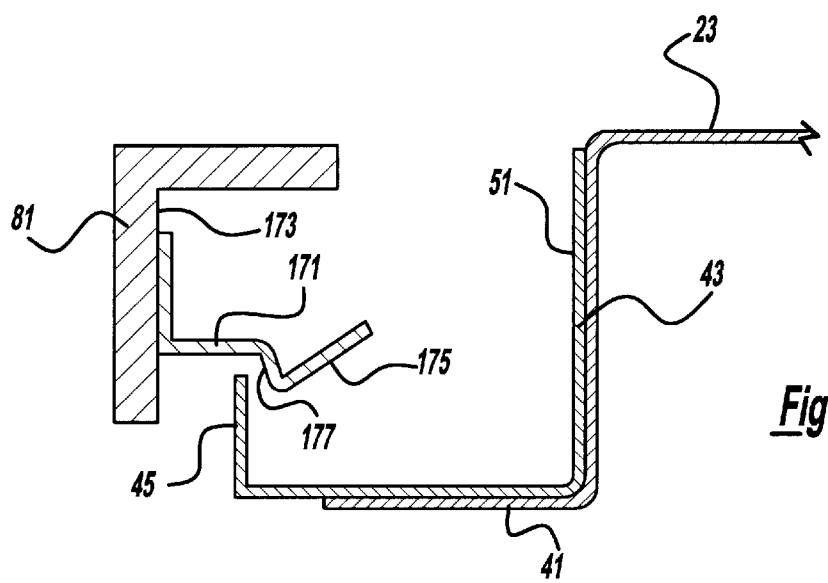
FIG. 8 is a cross sectional view, taken along line 8—8 of FIG. 5, showing the preferred embodiment sunroof.

Referring now to FIG. 8, a spring metal clip 171 is attached to a first face 173 of handle 81. Spring clip 171 has an angled lead-in portion 175 and an offset portion 177. When handle 81 is pushed against front segment 51 of frame 43, lead-in section 175 will upwardly deflect over vertical flange 45 whereafter offset 177 will engage flange 45 to maintain handle 81 in the desired fully extended and closed position until a superior force overcomes the spring resistance of clip 171. A similar spring clip 179 (see FIG. 12) is provided on the opposite face of handle 81 for maintaining the handle in its open position adjacent the side rail segment of frame 43. It is alternately envisioned that the spring clip or other detenting shapes may project between other link parts or may be reversed.

Figure 12:
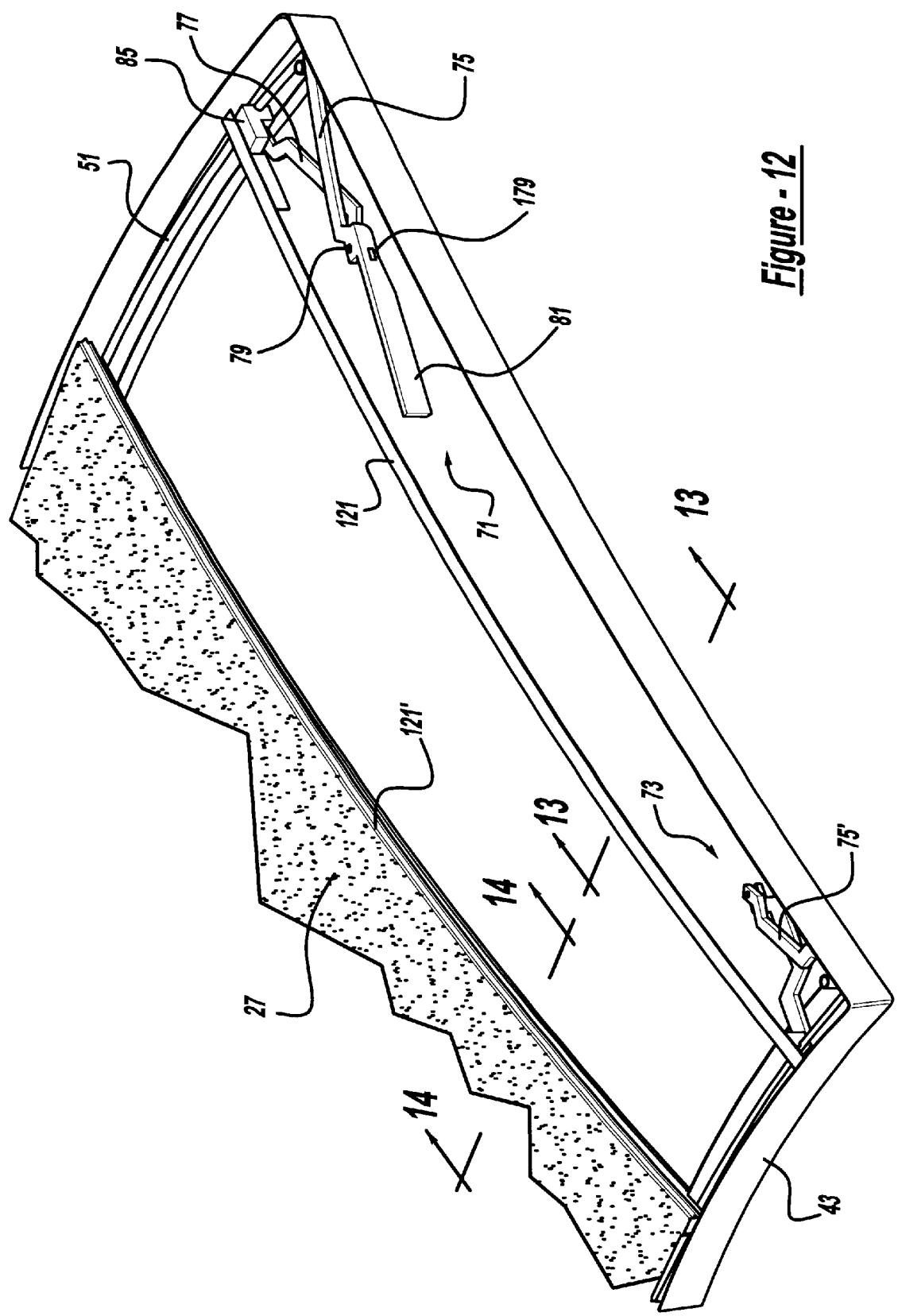
FIG. 12 is a fragmentary perspective view, like that of FIG. 4, showing the preferred embodiment sunroof with one side disposed in a partially open position, with the cover removed, and the other side in a closed position.
Figure 13:
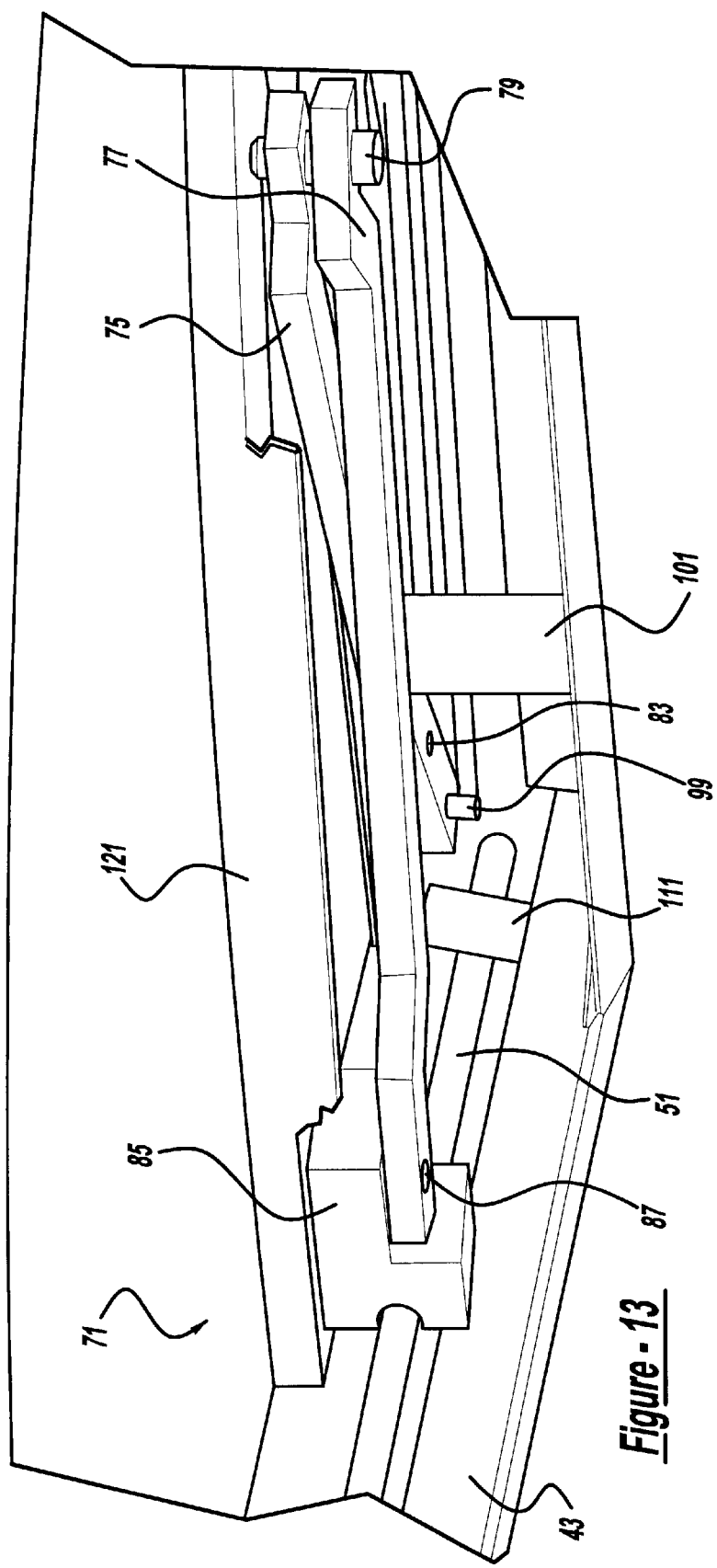
FIG. 13 is a fragmentary perspective view, like that of FIG. 11, showing the preferred embodiment sunroof disposed in a partially open position.
Figure 14:
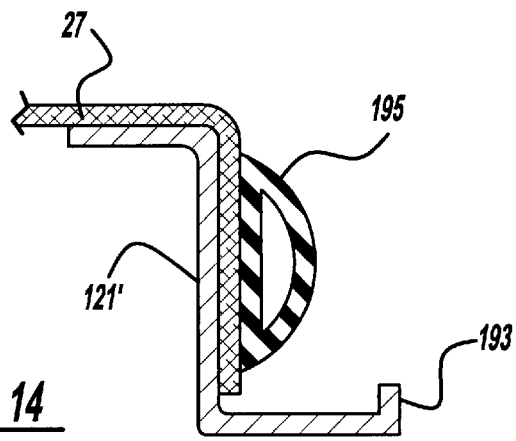
FIG. 14 is a cross sectional view, taken along line 14–14 of FIG. 12, showing the preferred embodiment sunroof.

The support and actuating mechanism construction for opposite cover 27 is like that employed for cover 25 except that element 121' has a modified cross sectional shape. This is shown in FIGS. 12 and 14. Element 121' has a drain trough portion 131 with an upturned flange 133. The ends of drain trough portion are open to allow water drainage into the cross-car extending, rear and front segments 51 and 53, respectively, of frame 43. A hollow D-shaped weatherstrip 135 is fastened to cover 27 at element 121'. When covers 25 and 27 are fully closed, as is illustrated in FIG. 1, the flange of element 121 (see FIG. 6) will be disposed immediately above drain trough 131 and will compress against weatherstrip 135. Hollow P-shaped weatherstrips (not shown) are additionally provided along the front and rear segments of frame 43 for contacting against the front and rear edges of covers 25 and 27. These P-shaped weatherstrips are preferably flocked.

Figure 2:
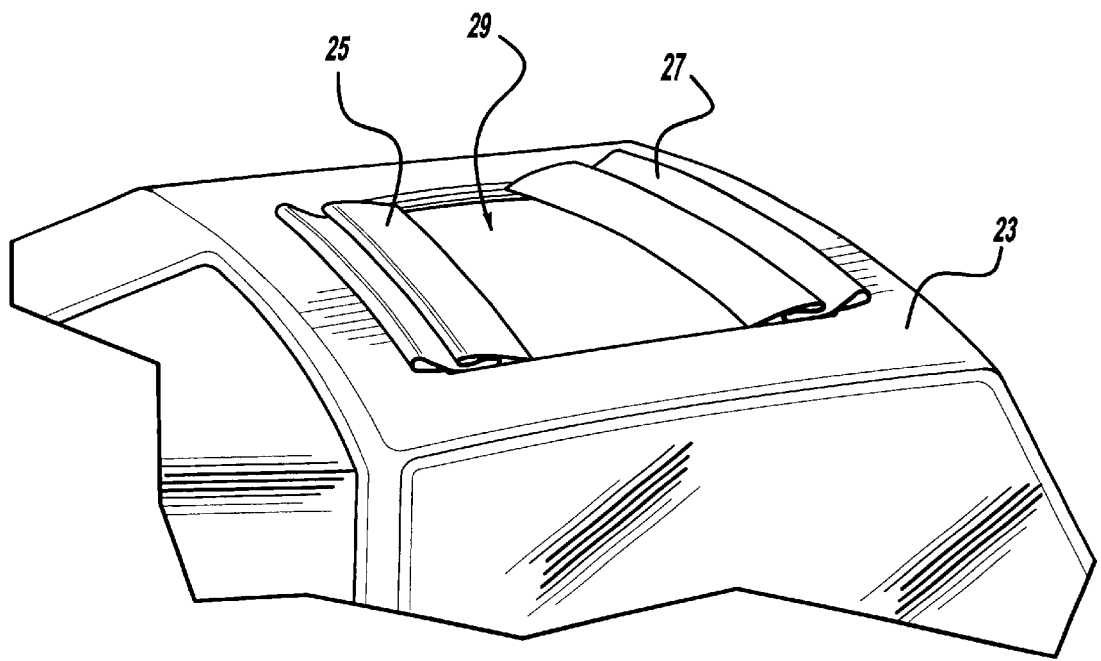
FIG. 2 is a perspective view showing the preferred embodiment sunroof with the covers disposed in open positions.
Figure 3:
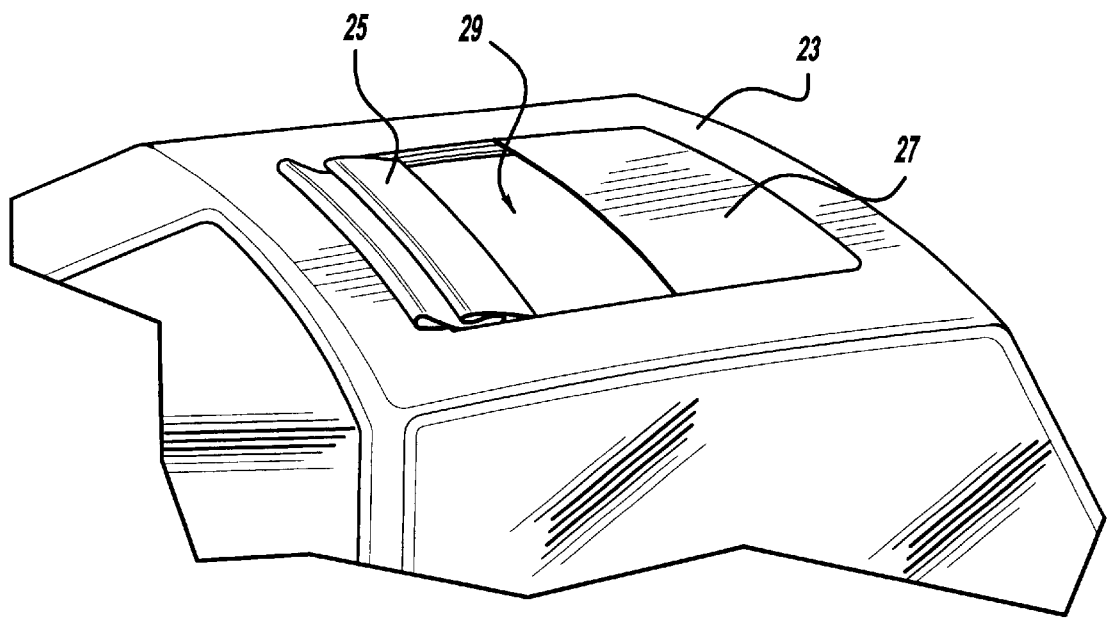
FIG. 3 is a perspective view showing the preferred embodiment sunroof, with one cover disposed in a closed position and the other cover disposed in an open position.

In operation, each cover 25 moves from a fully advanced and closed position, as shown in FIGS. 1 and 4–6, to a fully retracted and open position, as shown in FIG. 2, by a vehicle occupant manually pushing against handle 81. Actuation of handle 81 collapses driving linkage assembly 71 which, in turn, drives slave linkage assembly 73 by way of the cables. Collapsing movement of the linkage assemblies retracts element 121 and the corresponding first section of cover that extends between element 121 and batten 123. Further retraction of the linkage assemblies cause this first section to fold and overlap above a second section of cover 25 which extends between battens 125 and 127. As the first section further retracts in a cross-car manner toward the vehicle side rail, the second cover section will simultaneously move with the first cover section until the cover extending between batten 127 and frame 43 is taut at which point the cover is fully open. Cover 25 and its corresponding support structure are stowed in a generally horizontal overlapping manner over the portion of stationary roof 23 which is above the vehicle side rail. A portion of the cover and structure extend outboard of the sunroof opening while a portion still remains inboard of the sunroof opening, when stowed. This preferred stowed position increases interior headroom within the vehicle. However, an air dam or the like may be required above the windshield header to deter the wind from catching cover 25 when stowed.

Figure 15:
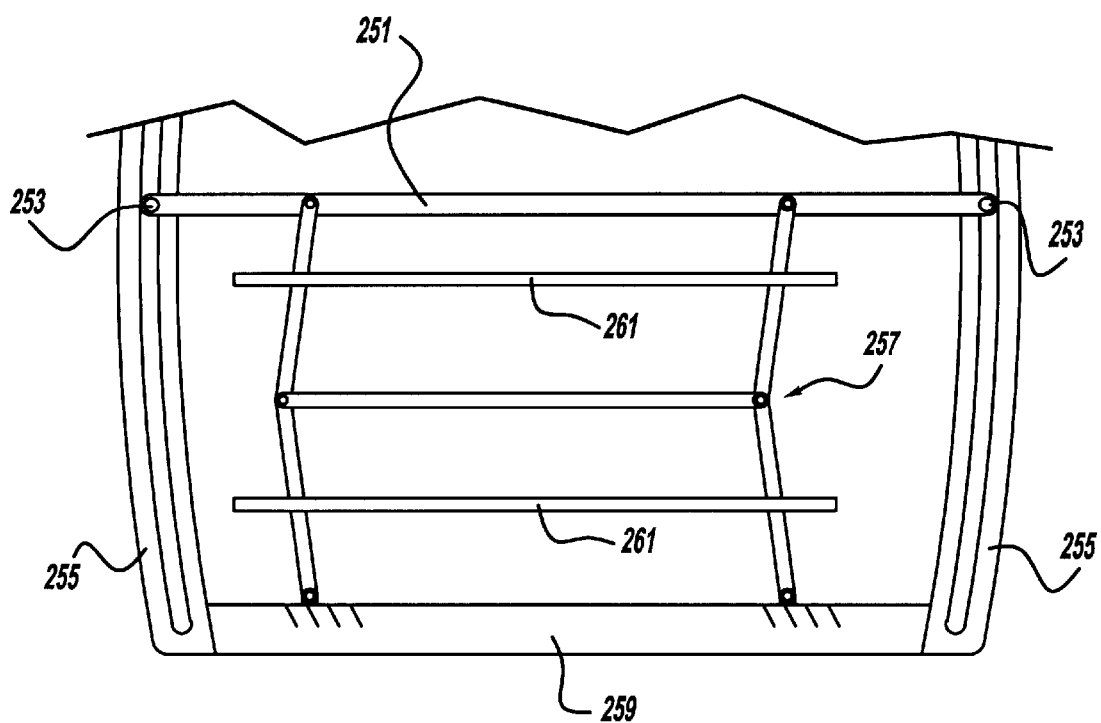
FIG. 15 is a diagrammatic and fragmentary top elevational view showing an alternate embodiment sunroof of the present invention.

FIG. 15 shows an alternate embodiment of the present invention sunroof. An elongated element 249 has coupling pins or rollers 253 at each end which slide within slotted plate-like tracks 255. Tracks 255 extends in a cross-car direction and overlie drain troughs. A multibar linkage assembly 257 couples element 249 to a stationary frame 259 by way of multiple pivot points and intermediate collapsible links. A handle (not shown) is mounted to one of the links in order to provide manual actuation by a vehicle occupant which translates into fore-and-aft crosscar movement of a cover. A set of battens 261 are mounted to linkage assembly 257. Battens are secured to a fabric or polymeric flexible cover (not shown) to allow retracted folding of the cover upon actuation of linkage assembly 257. An over-center linkage condition can be used to provide a positional locking feature.

While various embodiments of the automotive vehicle sunroof have been disclosed, it should be appreciated that various modifications may be made within the scope of the present invention. For example, the disclosed tracks and frames can have alternate cross sectional shapes, mounting arrangements and couplings. Furthermore, the disclosed linkage assemblies can alternately include additional linkages, camming slots and varied pivoting points. Moreover, an electric motor can be employed to actuate the present invention in place of a manual handle, but with a subsequent increase in part cost and complexity. Additionally, it is envisioned that the covers and supporting structure can be folded below the stationary roof, but with a subsequent reduction in headroom. If each cover is large enough, it may also be desired to fold the cover in three or more overlapping sections. While various materials have been disclosed, it should be appreciated that a variety of other materials can be employed. It is intended by the following claims to cover these and any other departures from the disclosed embodiments which fall within the true spirit of this invention.

The invention claimed is:

1. An automotive vehicle sunroof comprising:
   a member having a sunroof opening;
   a first linkage assembly movably coupled to the member;
   a first element operably spanning across a portion of the sunroof opening, the first element being coupled to the first linkage assembly;
   a first flexible cover attached to the first element, movement of the first linkage assembly operably causing the first element to move toward an edge of the sunroof opening while folding the first flexible cover thereby exposing at least a portion of the sunroof opening, the first cover operably folding in at least two overlapping sections;
   a second linkage assembly movably coupled to the member;
   a second elongated element operably spanning across a portion of the sunroof opening, the second elongated element being coupled to the second linkage assembly, the second elongated element being substantially parallel to the first element; and
   a second flexible cover attached to the second elongated element, retracting movement of the second linkage assembly operably causing the second element to move away from the first element while folding the second flexible cover, the elements being positioned adjacent each other when the flexible covers are closed to cover the sunroof opening.

2. The sunroof of claim 1 further comprising a plurality of elongated battens attached to the first cover, the battens being movable in response to operation of the first linkage assembly.

3. The sunroof of claim 2 further comprising a track affixed to the member and being elongated in a direction substantially perpendicular to an elongation direction of the first element, the first element and at least one of the battens being slidably coupled to the track.

4. The sunroof of claim 3 wherein the track includes a rod having a substantially circular cross sectional shape, the first element includes a flange, the cover wraps around the flange, and the battens are substantially parallel to the first element.

5. The sunroof of claim 2 further comprising fingers connecting at least one of the battens to the first element, the fingers being spaced apart from each other, the fingers and the first element being substantially rigid.

6. The sunroof of claim 1 wherein the first cover folds and is stowed in an open position above the member.

7. The sunroof of claim 1 wherein the first cover is wrapped around the first element, a side rail edge of the member at the sunroof opening defines a vertical plane, the first element is substantially rigid and positioned in-board of the vertical plane when the first cover is in its closed and open positions.

8. The sunroof of claim 1 wherein the first linkage assembly includes at least a pair of pivotable links and a handle, and the first linkage assembly is manually actuable by moving the handle.

9. The sunroof of claim 1 further comprising a flexible detent operable to removably secure the first linkage assembly in a desired position.

10. The sunroof of claim 1 wherein the cover has an outboard edge secured to the member.

11. The sunroof of claim 1 further comprising a stationary roof panel, the member being a rigid frame having a drain trough, and the frame being fastened to the stationary roof panel.

12. An automotive vehicle sunroof comprising:
    a first linkage assembly;
    a first elongated element coupled to the linkage assembly;
    a first flexible cover attached to the first elongated element;
    a second linkage assembly movable independently of the first linkage assembly;
    a second elongated element coupled to the second linkage assembly, the elongated elements being substantially parallel to each other when closed;
    a second flexible cover attached to the second elongated element;
    wherein movement of the linkage assemblies operably causes the respective elongated elements and flexible covers to move inboard toward each other to define closed sunroof positions, reverse movement of the linkage assemblies operably causes the respective elongated elements and flexible covers to move outboard away from each other when it is desired to place them in open sunroof positions; and
    a third linkage assembly coupled to the first elongated element, the third linkage assembly being on a substantially opposite side of a sunroof opening from the first linkage assembly, at least one flexible device coupling the first and third linkage assemblies together such that movement of one of the linkage assemblies causes concurrent movement of the other of the linkage assemblies.

13. The sunroof of claim 12 further comprising multiple elongated battens attached to the first cover, the battens being movable in response to operation of the first linkage assembly.

14. The sunroof of claim 13 further comprising a stationary track elongated in a direction substantially perpendicular to that of the first elongated element, the first elongated element and at least one of the battens being slidably coupled to the track.

15. The sunroof of claim 14 wherein the track includes a rod having a substantially circular cross sectional shape, the first elongated member includes a flange, the first cover wraps around the flange, and the battens are substantially parallel to the first elongated member.

16. The sunroof of claim 13 further comprising fingers connecting at least one of the battens to the first elongated member, the fingers being spaced apart from each other, the fingers and the first elongated member being substantially rigid.

17. The sunroof of claim 12 wherein the first cover folds in at least two overlapping sections.

18. The sunroof of claim 17 wherein the second cover folds in at least two overlapping sections.

19. The sunroof of claim 12 wherein the flexible device is a cable coupling the first and third linkage assemblies together.

20. The sunroof of claim 12 wherein the covers are independently movable.

21. The sunroof of claim 12 further comprising a handle coupled to the first linkage assembly, the handle being manually actuable to cause movement of the first cover.

22. An automotive vehicle sunroof comprising:
a member defining a sunroof opening;
first and second tracks being affixed to the member;
a first pivotable linkage assembly movably coupled to the member;
a second pivotable linkage assembly movably coupled to the member, the second linkage assembly being located on a substantially opposite side of the sunroof opening from the first linkage assembly;
multiple battens attached to the cover, the battens being movable in response to operation of the linkage assemblies;
an elongated element bridging across a portion of the sunroof opening when in a closed position, the elongated element being coupled to the linkage assemblies, the elongated element and at least one batten being elongated in a direction substantially perpendicular to the first and second tracks;
fingers connecting at least one of the battens to the elongated element, the fingers being spaced apart from each other, the fingers and the elongated element being substantially rigid;
a sunroof cover attached to the elongated element and the batten, the cover being movable from a closed position, covering at least a portion of the sunroof opening, to an open position;
a handle mechanically coupled to and movable with the first linkage assembly; and
at least one elongated and flexible device connecting the linkage assemblies together, the device being located outboard of the sunroof opening;
wherein manual actuation of the handle unlocks at least one of the linkage assemblies and causes the first linkage assembly to move while the device concurrently drives the second linkage assembly.

23. The sunroof of claim 22 wherein the device is a cable.

24. The sunroof of claim 23 further comprising a second elongated cable coupling the linkage assemblies together, the cables being movably secured to the member.

25. The sunroof of claim 22 wherein the sunroof cover is flexible.

26. The sunroof of claim 25 wherein the sunroof cover folds in at least two overlapping sections when located in its open position away from the vehicle centerline.

27. The sunroof of claim 22 wherein the elongated element and at least one of the battens are slidably coupled to the first track.

28. An automotive vehicle sunroof comprising:
a member defining a sunroof opening;
first and second tracks affixed to the member, each of the tracks including a rod having a substantially circular cross sectional shape;
a first pivotable linkage assembly movably coupled to the member;
a second pivotable linkage assembly movably coupled to the member, the second linkage assembly being located on a substantially opposite side of the sunroof opening from the first linkage assembly;
at least one batten;
an elongated element bridging across a portion of the sunroof opening when in a closed position, the elongated element being coupled to the linkage assemblies, the elongated element and the batten being elongated in a direction substantially perpendicular to the first and second tracks;
a sunroof cover attached to the elongated element and the batten, the cover being movable from a closed position, covering at least a portion of the sunroof opening, to an open position;
the elongated element including a flange, the cover wrapping around the flange, and the battens being substantially parallel to the elongated element;
a handle mechanically coupled to the first linkage assembly; and
at least one elongated and flexible device connecting the linkage assemblies together, the device being located outboard of the sunroof opening;
wherein manual actuation of the handle causes the first linkage assembly to move while the device concurrently drives the second linkage assembly.

29. The sunroof of claim 28 wherein the cover folds in at least two overlapping sections.

30. The sunroof of claim 28 further comprising multiple of the elongated battens attached to the cover, the battens being movable in response to operation of the linkage assemblies.

31. The sunroof of claim 30 further comprising fingers connecting at least one of the battens to the elongated element, the fingers being spaced apart from each other, the fingers and the elongated element being substantially rigid.

32. An automotive vehicle sunroof comprising:
a member having a surface defining an internal sunroof opening, the surface also defining at least one vertical plane;
a sunroof cover having a first section and a second section; and
a mechanism movably coupling the cover to the member;
wherein the first and second sections of the cover are stacked in a substantially overlapping manner when the cover is retracted in a cross-car direction to an open position, the cover being at least partially outboard of the plane when in the open position.

33. The sunroof of claim 32 further comprising multiple elongated supports coupled to the cover, the supports spanning across a portion of the sunroof opening when the cover is closed, and the supports operably assisting in folding the cover when the cover is retracted to the open position.

34. The sunroof of claim 33 wherein at least a first pair of the supports are fastened to the first section, at least a second pair of the supports are attached to the second section, and the cover is foldable between the first and second pairs of supports.

35. The sunroof of claim 32 wherein the cover is substantially flexible.

36. The sunroof of claim 32 wherein an outboard edge of the cover is secured to the member in all operating positions.

37. The sunroof of claim 32 wherein the mechanism includes at least one manually actuable linkage assembly.

38. The sunroof of claim 32 further comprising a stationary roof panel, the member being a rigid frame having a drain trough, and the frame being fastened to the stationary roof panel.

39. The sunroof of claim 32 wherein the member is a stationary roof.

40. The sunroof of claim 32 further comprising:
a second sunroof cover; and
a second mechanism movably coupling the second cover to the member;
the covers advancing toward each other when the covers are moved from open positions to closed positions.

41. The sunroof of claim 32 wherein at least a portion of the cover is located in-board of the plane when the cover is located in its open position.

42. An automotive vehicle sunroof comprising:
- a first elongated track and a second elongated track, the tracks being substantially parallel;
- a flexible sunroof cover movable from a closed position to an open position;
- a first linkage assembly coupling the cover to the first track;
- a second linkage assembly coupling the cover to the second track;
- each of the linkage assemblies including a first link and a second link, the first link operably pivoting relative to the second link when the cover is advanced and retracted, the first link having an end slidably coupled to the corresponding track and the second link having an end stationarily mounted relative to the corresponding track; and
- a manually actuable handle attached to the first linkage assembly.

43. The sunroof of claim 42 wherein the cover is folded in an overlapping manner when in its open position.

44. The sunroof of claim 43 wherein the folded sections of the cover overlap in a stacked manner with one section disposed substantially on top of the other.

45. The sunroof of claim 42 further comprising at least one cable coupling the linkage assemblies together such that manual actuation of the handle will cause substantially simultaneous movement of the linkage assemblies.

46. The sunroof of claim 42 wherein the tracks are rods having substantially circular cross sectional shapes.

47. The sunroof of claim 42 wherein the cover moves in a crosscar manner when advanced and retracted.

48. The sunroof of claim 42 further comprising a second sunroof cover coupled to the tracks, the covers being independently movable.

49. A method of operating an automotive vehicle sunroof having a cover, elongated supports and a linkage assembly, the method comprising:
- (a) manually collapsing the linkage assembly;
- (b) flexing the cover;
- (c) advancing and retracting the cover in a cross-car direction, the cover being spaced away from a longitudinal vehicle centerline when in an open retracted position; and
- (d) folding the cover in a overlapping manner.

50. The method of claim 49 further comprising sliding at least one elongated element supporting the cover relative to an engaged stationary track, and draining water in a drain trough coupled for movement with at least one of the elongated elements.

51. The method of claim 49 further comprising advancing a second sunroof cover toward the first sunroof cover and the longitudinal vehicle centerline when covering a sunroof opening, and folding the cover in at least two overlapping sections with the folded fabric spanning between the sections.

52. The method of claim 49 further comprising rotating a first link relative to an attached second link along a substantially horizontal plane while the cover is retracting.

53. The method of claim 49 further comprising manually moving a handle with the linkage assembly.

54. The method of claim 49 further comprising driving an elongated and flexible member to cause collapsing of a slave linkage assembly concurrently with collapsing the first linkage assembly.

* * * * *

UNITED STATES PATENT AND TRADEMARK OFFICE
CERTIFICATE OF CORRECTION

PATENT NO. : 6,409,259 B1
DATED : June 25, 2002
INVENTOR(S) : Jeffrey S. Patelczyk et al.

It is certified that error appears in the above-identified patent and that said Letters Patent is hereby corrected as shown below:

Column 3,
Line 3, "49" should be -- 51 --.

Column 4,
Lines 1 and 8, "131" should be -- 191 --.
Line 1, "133" should be -- 193 --.
Lines 5 and 9, "135" should be -- 195 --.
Lines 41 and 45, "249" should be -- 251 --.

Signed and Sealed this

Twenty-ninth Day of July, 2003

JAMES E. ROGAN
*Director of the United States Patent and Trademark Office*